(12) United States Patent
Nishikawa et al.

(10) Patent No.: US 10,211,756 B2
(45) Date of Patent: Feb. 19, 2019

(54) INVERTER CIRCUIT AND POWER CONVERSION DEVICE

(71) Applicant: OMRON Corporation, Kyoto-shi, Kyoto (JP)

(72) Inventors: Takeo Nishikawa, Kyoto (JP); Wataru Okada, Kizugawa (JP); Takayoshi Tawaragi, Kitakatsuragi-gun (JP); Satoshi Iwai, Hirakata (JP)

(73) Assignee: OMRON Corporation, Kyoto-shi (JP)

(*) Notice: Subject to any disclaimer, the term of this patent is extended or adjusted under 35 U.S.C. 154(b) by 0 days.

(21) Appl. No.: 15/786,788

(22) Filed: Oct. 18, 2017

(65) Prior Publication Data

US 2018/0041138 A1    Feb. 8, 2018

Related U.S. Application Data

(63) Continuation of application No. PCT/JP2016/057181, filed on Mar. 8, 2016.

(30) Foreign Application Priority Data

Jun. 30, 2015   (JP) .................... 2015-131464

(51) Int. Cl.
*H02M 7/5387*   (2007.01)
*H02M 7/48*   (2007.01)
(Continued)

(52) U.S. Cl.
CPC .......... *H02M 7/5387* (2013.01); *H02J 3/383* (2013.01); *H02M 7/48* (2013.01); *H02M 7/797* (2013.01); *H02H 7/122* (2013.01); *H02M 1/34* (2013.01); *H02M 2001/0051* (2013.01); *H02M 2001/123* (2013.01)

(58) Field of Classification Search
CPC ............................................ H02M 2001/0051
USPC ............. 363/40–43, 55, 56.02, 56.03, 56.05, 363/56.12, 131
See application file for complete search history.

(56) References Cited

U.S. PATENT DOCUMENTS

| 7,957,160 B2 * | 6/2011 | Babcock | ............... H02M 7/497 363/131 |
| 2002/0118559 A1 * | 8/2002 | Kurokami | ............... H02M 1/15 363/131 |

(Continued)

FOREIGN PATENT DOCUMENTS

| CN | 104377982 A | 2/2015 |
| DE | 10221592 A1 | 12/2003 |

(Continued)

OTHER PUBLICATIONS

An English translation of the International Search Report of PCT/JP2016/057181 dated May 31, 2016.
(Continued)

*Primary Examiner* — Gary A Nash
(74) *Attorney, Agent, or Firm* — Metrolexis Law Group, PLLC

(57) ABSTRACT

An inverter circuit provided in a power conversion device includes a full-bridge inverter, and a short circuit part. The short circuit part includes switching elements and clamp elements connected to the switching elements. The clamp elements suppress application of an excessive voltage such as a surge voltage to the switching elements.

11 Claims, 19 Drawing Sheets

(51) Int. Cl.
*H02J 3/38* (2006.01)
*H02M 7/797* (2006.01)
*H02M 1/34* (2007.01)
*H02H 7/122* (2006.01)
*H02M 1/00* (2006.01)
*H02M 1/12* (2006.01)

(56) References Cited

U.S. PATENT DOCUMENTS

| 2007/0230220 | A1* | 10/2007 | Chan | H02M 1/32 363/16 |
| 2008/0013346 | A1* | 1/2008 | Westmoreland | H02M 1/34 363/37 |
| 2011/0058393 | A1* | 3/2011 | Suzuki | H02M 1/34 363/16 |
| 2011/0303534 | A1* | 12/2011 | Yanagiya | C23C 14/3464 204/298.08 |
| 2012/0155141 | A1* | 6/2012 | Esaka | H02J 3/381 363/132 |
| 2013/0235628 | A1 | 9/2013 | Dong et al. | |

FOREIGN PATENT DOCUMENTS

| JP | 2009-89541 A | 4/2009 |
| WO | 2014156003 A1 | 10/2014 |

OTHER PUBLICATIONS

An English translation of the Written Opinion of PCT/JP2016/057181 dated May 31, 2016.
The extended European search report (EESR) dated May 16, 2018 in a counterpart European application.

* cited by examiner

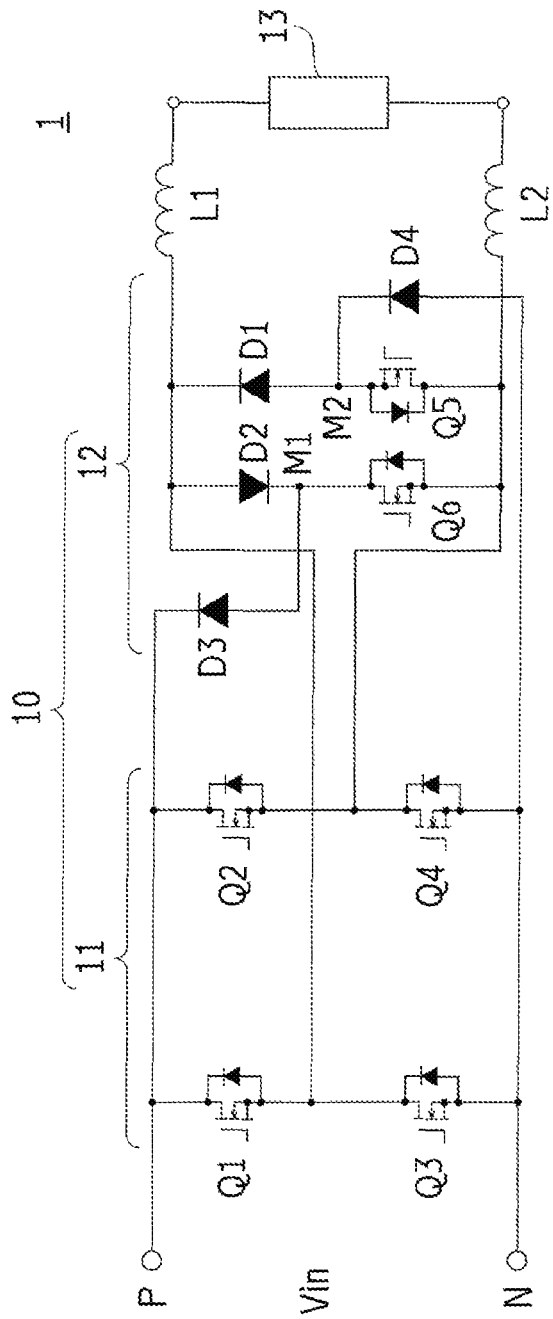
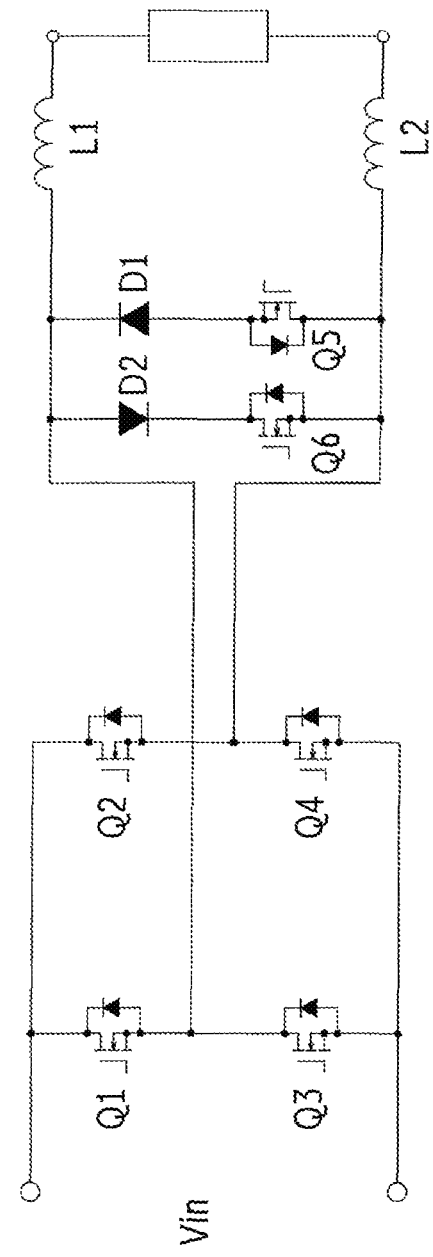
Fig. 3A
Fig. 3B

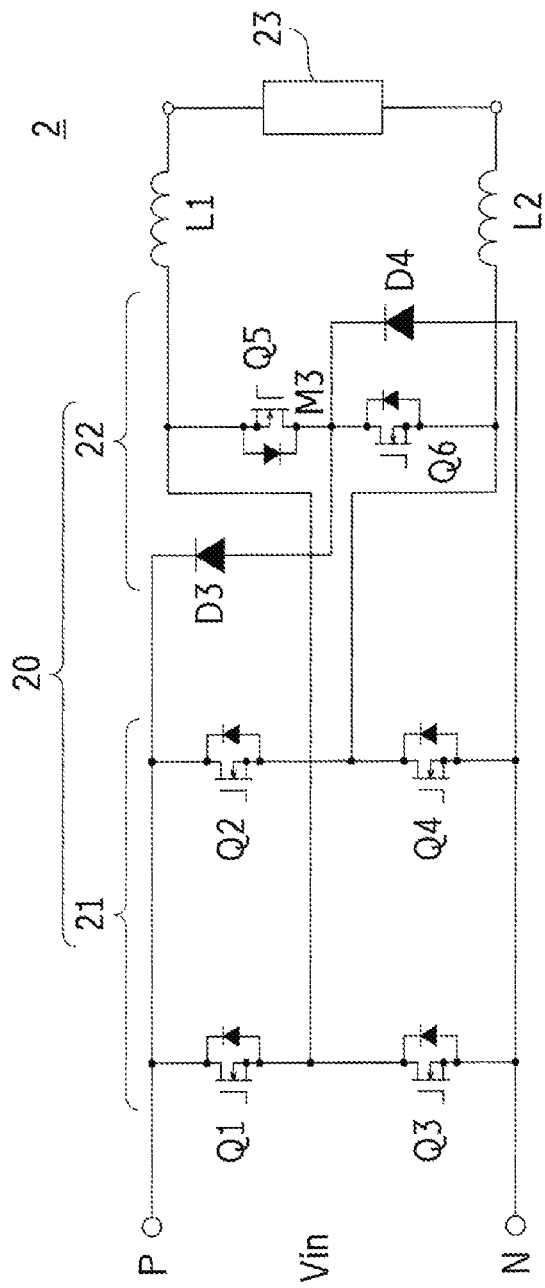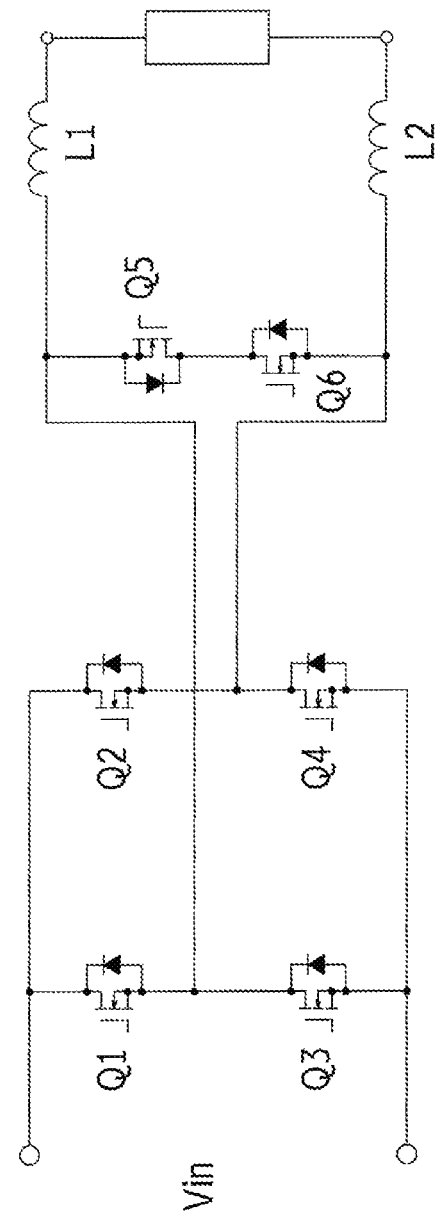
Fig. 5A
Fig. 5B

Fig. 17A
Fig. 17B
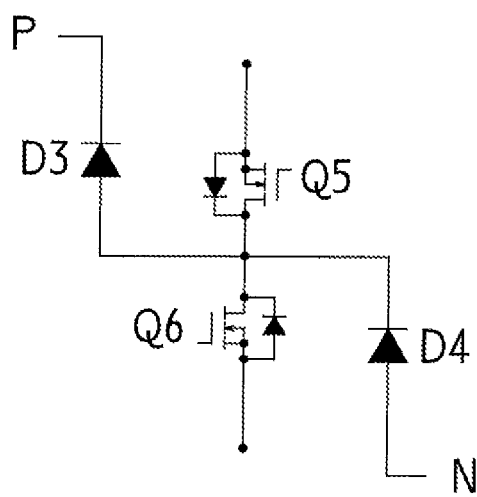
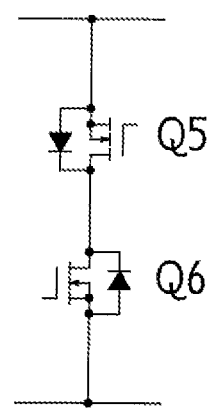

INVERTER CIRCUIT AND POWER CONVERSION DEVICE

CROSS REFERENCE TO RELATED APPLICATIONS

This application is a continuation application of International Application No. PCT/JP2016/057181, filed on Mar. 8, 2016, which claims priority based on the Article 8 of Patent Cooperation Treaty from prior Japanese Patent Application No. 2015-131464, filed on Jun. 30, 2015, the entire contents of which are incorporated herein by reference.

TECHNICAL FIELD

The disclosure relates to an inverter circuit including a short circuit part configured to short-circuit output from a full-bridge inverter, and a power conversion device.

BACKGROUND ART

For example, in a power conversion device such as an inverter that converts, into an AD, a DC output obtained by power generation by a solar battery, a HERIC CIRCUIT obtained by combining a full-bridge inverter with a switching element that short-circuits is used (for example, refer to Patent Document 1).

As a switching element used in a device such as a power conversion device, an SJ-MOSFET (Super Junction Metal-Oxide-Semiconductor Field effect transistor) having a super junction structure is attracting attention.

FIG. 1A and FIG. 1B each are a schematic sectional view schematically illustrating an internal structure of a MOSFET. FIG. 1A is an SJ-MOSFET having a super junction structure, and FIG. 1B is conventional MOSFET for comparison. The SJ-MOSFET is a MOSFET having a periodic p-n column structure called a super junction structure in a drift layer. While the conventional MOSFET has a depletion layer vertically extending from a p base bottom into a low concentration n layer (drift layer) in an OFF state, the super junction structure has a depletion layer horizontally extending from a vertically extending p-n junction.

In the SJ-MOSFET thus formed, even when the concentration of an n layer that is a current path is increased, depletion is likely to occur. Therefore, the SJ-MOSFET has a characteristic that while high withstand voltage in an OFF state is ensured, on-resistance can be lowered to 1/100 or less of on-resistance in the conventional MOSFET. After the SJ-MOSFET is publicly presented in 1997, active development is performed. For example, horizontal microfabrication of a super junction structure is improved by technological progress of crystal growth, machining technology and the like, so that an aspect ratio can be increased, and on-resistance per unit area is further reduced.

PRIOR ART DOCUMENT

Patent Document

Patent Document 1: German Unexamined Patent Publication No. 10221592

SUMMARY OF THE INVENTION

Problems To Be Solved By The Invention

However, while the SJ-MOSFET is expected as a high efficient device which is relatively a low cost, and has low on-resistance, the SJ-MOSFET has a problem that parasitic capacitance is large, and a reverse recovery characteristic of a built-in diode is poor.

FIG. 2 is a circuit diagram illustrating an example of an inverter. The inverter illustrated in FIG. 2 is a HERIC CIRCUIT that includes a full-bridge inverter using switching elements Q1, Q2, Q3, Q4, and a short circuit part using two sets of switching elements Q5, Q6 wired in parallel such that the conductive directions are the opposite directions. In the HERIC CIRCUIT illustrated in FIG. 2, the switching elements Q1 and Q4 are turned on so as to switch to power voltage operation from a circulation state where the switching element Q5 is turned on, an input voltage is applied to the switching element Q6 of a circulation circuit (short circuit part) to which a voltage is not applied in the circulation state. When the input voltage is applied to the switching element Q6 to which a voltage is not applied, resonance is generated by parasitic capacitance of the switching element Q6 and parasitic inductance of a wire. At this time, when the parasitic capacitance of the switching element Q6 is large, each device may be damaged by a surge voltage resulting from resonance.

One or more aspects have been made in view of the above circumstance, and in a short circuit part that short-circuits output from a full-bridge inverter, a clamp element is connected to a switching element. Consequently, one or more aspects may provide an inverter circuit that suppresses influence by an overvoltage such as a surge voltage, and a power conversion device including such an inverter circuit.

Means For Solving The Problem

In order to solve the above problem, an inverter circuit according to one or more aspects is an inverter circuit including a short circuit part configured to short-circuit output from a full-bridge inverter, in which the short circuit part includes: a switching element; and a clamp element connected to the switching element.

An inverter circuit is an inverter circuit including a short circuit part configured to short-circuit output from a full-bridge inverter, in which the short circuit part includes: a rectifier element and a switching element connected in series; and a clamp element connected between the rectifier element and the switching element.

The clamp element has an anode side connected to a cathode side of the rectifier element, or a cathode side connected to an anode side of the rectifier element.

The clamp element has a cathode side connected to a cathode side of the rectifier element, or an anode side connected to an anode side of the rectifier element.

In the inverter circuit, the rectifier element and the switching element connected in series include two sets of the rectifier elements and the switching elements, and the two sets of rectifier elements and switching elements are wired in parallel such that conductive directions are opposite directions.

An inverter circuit is an inverter circuit including a short circuit part configured to short-circuit output from a full-bridge inverter, in which the short circuit part includes: two switching elements connected in series; and a clamp element connected between the two switching elements.

In inverter circuit, the switching elements are connected such that conductive directions are opposite directions, and the clamp element includes two clamp elements that are a clamp element whose anode side is connected and a clamp element whose cathode side is connected.

In inverter circuit, another end of the clamp element is connected to the full-bridge inverter.

In inverter circuit, the switching element is a field effect transistor having a super junction structure.

Furthermore, a power conversion device according to one or more aspects includes the above inverter circuit; an input part configured to receive input of DC power; and an output part configured to output AC power, in which the inverter circuit converts a DC current to an AC current.

In one or more aspects, the clamp element can suppress an overvoltage applied to the switching element.

Effect of the Invention

One or more aspects may include a switching element, and a clamp element connected to the switching element, as a short circuit part configured to short-circuit output from a full-bridge inverter. Consequently, the clamp element can suppress an overvoltage applied to the switching element, and therefore excellent effects capable of suppressing generation of abnormality such as damage of the switching element, and the like is exhibited.

BRIEF DESCRIPTION OF THE DRAWINGS

FIG. 3A and FIG. 3B each are a circuit diagram illustrating an example of a power conversion device including an inverter circuit.

FIG. 5A and FIG. 5B each are a circuit diagram illustrating an example of a power conversion device including an inverter circuit.

FIG. 17A and FIG. 17B each are a circuit diagram illustrating an inverter circuit used in an experiment.

MODE FOR CARRYING OUT THE INVENTION

Figure 1A:
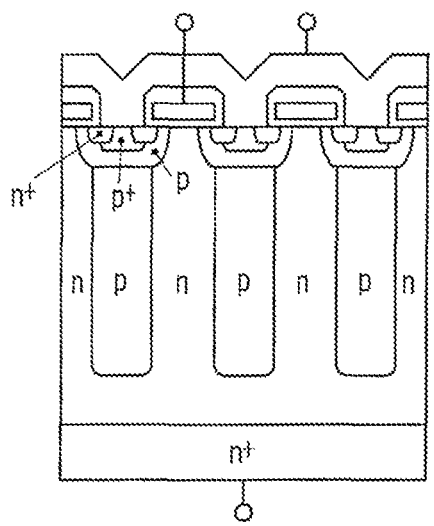
FIG. 1A and FIG. 1B each are a schematic sectional view schematically illustrating an internal structure of a MOSFET.
Figure 1B:
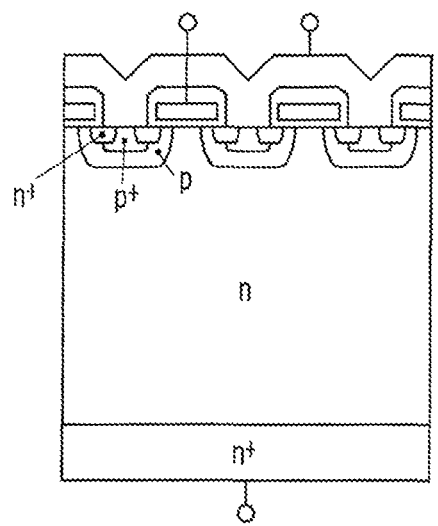
Figure 2:
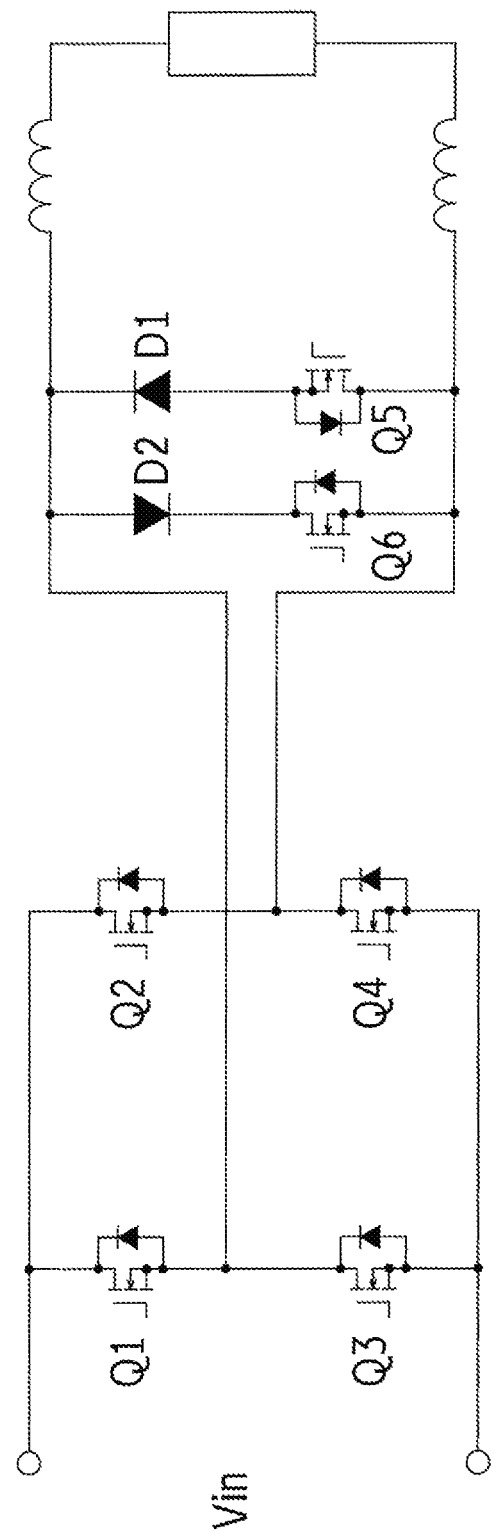
FIG. 2 is a circuit diagram illustrating an example of an inverter.

Hereinafter, embodiments will be described with reference to the drawings. The following embodiments each are an example embodying the present invention, and the technical scope of the present invention is not limited.

<Embodiment 1<

FIG. 3A and FIG. 3B each are a circuit diagram illustrating an example of a power conversion device including an inverter circuit. FIG. 3A illustrates a power conversion device 1 including an inverter circuit 10 of Embodiment 1, and FIG. 3B illustrates a power conversion device including a conventional inverter circuit for comparison. The power conversion device 1 illustrated in FIG. 3A is used in a system such as a solar power generation system, and includes the inverter circuit 10 that receives a DC voltage output from a power source such as a solar battery (not illustrated) in an input part to convert the received DC voltage to an AC voltage, inductors L1, L2, and outputs the AC voltage converted by the inverter circuit 10 from an output part to an electric power load 13 through the inductors L1, L2. The DC voltage received by the power conversion device 1 that includes the inverter circuit 10 is converted to a suitable voltage by a converter (not illustrated) such as a DC-DC converter as appropriate.

The inverter circuit 10 illustrated in FIG. 3A includes a full-bridge inverter 11, and a short circuit part 12. The full-bridge inverter 11 is a full-bridge circuit obtained by combining switching elements Q1, Q2, Q3, Q4. More specifically, in the full-bridge circuit, the switching elements Q1, Q3 connected in series, and the switching elements Q2, Q4 connected in series connect a pair of electric power lines on an input side. Furthermore, respective electric power lines output to the short circuit part 12 are connected between the switching elements Q1 and Q3, and between the switching elements Q2 and Q4. The switching elements Q1, Q2, Q3, Q4 are semiconductor switches each configured by a semiconductor such as an SJ-MOSFET (Super Junction Metal-Oxide-Semiconductor Field effect transistor) which is a field effect transistor having a super junction structure, and reflux diodes are incorporated inversely parallel to each other.

In the short circuit part 12, a rectifier element D1 and a switching element Q5 connected in series, and a rectifier element D2 and a switching element Q6 connected in series connect the pair of electric power lines connected to the full-bridge inverter 11. The rectifier element D1 and the switching element Q5, and the rectifier element D2 and the switching element Q6 are connected in parallel such that the conductive directions of these two sets are the opposite directions. Additionally, one end of a clamp element D3 is connected between the rectifier element D2 and the switching element Q6, and another end of the clamp element D3 is connected to the switching element Q1 and the switching element Q2 of the full-bridge inverter 11. Furthermore, one end of a clamp element D4 is connected between the rectifier element D1 and the switching element Q5, and another end of the clamp element D4 is connected to the switching element Q3 and the switching element Q4 of the full-bridge inverter 11. Additionally, in the inverter circuit 10 illustrated in FIG. 3A, an anode side of the clamp element D3 is connected to a cathode side of the rectifier element D2, and a cathode side of the clamp element D4 is connected to an anode side of the rectifier element D1.

In the inverter circuit 10 illustrated in FIG. 3A, the rectifier element D1, the rectifier element D2, the switching element Q6, and the switching element Q5 of the short circuit part 12 form a circulation portion of a HERIC CIRCUIT. Therefore, for each of the rectifier elements D1, D2, an element having rectifying action such as a diode is used in order to prevent a backward flow of the circulation portion. For the clamp elements D3, D4, elements having rectifying action such as diodes are used in order to clamp an overcurrent based on a surge voltage to prevent the overcurrent from flowing into the switching elements Q5, Q6. The switching elements Q5, Q6 provided in the short circuit part 12 each are a semiconductor switch formed by a semiconductor such as an SJ-MOSFET, and incorporate reflux diodes inversely parallel.

In a case where characteristics as diodes of the switching elements Q5, Q6, for example, reverse recovery characteristics are excellent, the rectifier elements D1, D2 can be omitted. The rectifier elements D1, D2 are disposed, so that it is possible to prevent a backward flow in the circulation portion of the HERIC CIRCUIT even in a case where the characteristics as the diodes of the switching elements Q5, Q6 are not sufficient.

As apparent from comparison of FIG. 3A and FIG. 3B, the inverter circuit 10 according to Embodiment 1 illustrated in FIG. 3A is different from the conventional inverter circuit in that the inverter circuit 10 includes the clamp elements D3, D4. In FIG. 3A, a potential on a positive side of an input voltage Vin is denoted by P (upper side in the figure), and a potential on a negative side is denoted by N (lower side in the figure). In a case where a midpoint potential M1 between the rectifier element D2 and the switching element Q6 becomes higher than the P potential, the clamp element D3 brought into conduction, and the midpoint potential M1 approaches the P potential. In a case where the midpoint potential M1 becomes lower than the N potential, the rectifier element D2, the rectifier element D1, and the clamp element D4 are brought into conduction, and the midpoint potential M1 approaches the N potential. The same is applicable to a midpoint potential M2 between the rectifier element D1 and the switching element Q5. In a case where the midpoint potential M2 is higher than the P potential, the rectifier element D1, the rectifier element D2, and the clamp element D3 are brought into conduction, and the midpoint potential M2 approaches the P potential. In a case where the midpoint potential M2 is lower than the N potential, the clamp element D4 is brought into conduction, and the midpoint potential M2 approaches the N potential.

The inverter circuit 10 illustrated in FIG. 3A is configured as the HERIC CIRCUIT obtained by combining the full-bridge inverter 11 with the short circuit part 12, and the SJ-MOSFET is used for each of the switching elements Q1, Q2, Q3, Q4, Q5, Q6. While the SJ-MOSFET has an excellent characteristic that the SJ-MOSFET is a high efficient device having low on-resistance, parasitic capacitance is large, and therefore a surge voltage due to resonance is increased, and abnormality such as damage occurs in each device. However, the clamp elements D3, D4 suppress variation of the midpoint potentials M1, M2 as described above, and therefore the clamp elements D3, D4 can reduce influence by a surge voltage. Therefore, while characteristics of the SJ-MOSFETs are utilized, it is possible to reduce adverse influence on the device.

Now, in Embodiment 1, influence of the conductive directions of the clamp elements D3, D4 will be described.

Figure 4A:
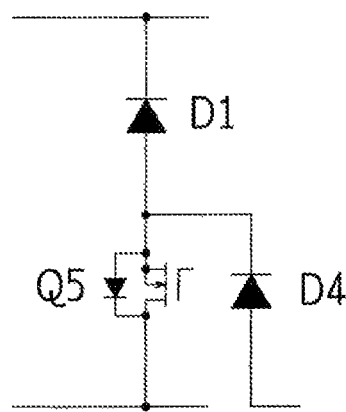
FIG. 4A and FIG. 4B each are a circuit diagram illustrating a part of a short circuit part provided in an inverter circuit.
Figure 4B:
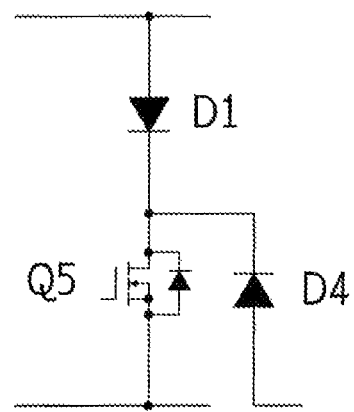

FIG. 4A and FIG. 4B each are a circuit diagram illustrating a part of the short circuit part 12 including the inverter circuit 10. FIG. 4A and FIG. 4B each illustrate the rectifier element D1, the clamp element D4, and the switching element Q5 provided in the short circuit part 12 of the inverter circuit 10. FIG. 4A illustrates a configuration in which the anode side of the element D4 is connected to the cathode side of the rectifier element D1 as illustrated in FIG. 3A, and FIG. 4B illustrates a configuration in which the cathode side of the clamp element D4 is connected to the cathode side of the rectifier element D1. FIG. 4B is one modification of the inverter circuit 10 of Embodiment 1.

Even in a case of the configuration illustrated in FIG. 4B, when the potential between the switching element Q5 and the rectifier element D1 is largely lowered, the clamp element D4 can perform clamping. However, in the case where the inverter circuit 10 is configured as illustrated in FIG. 4B, when the potential between the switching element Q5 and the rectifier element D1 is largely increased, the clamp element D4 cannot perform clamping. In this case, the direction becomes the opposite direction to the rectifier element D1, and therefore an excessive voltage is applied to the switching element Q5. In a case where the anode side of the clamp element D4 is connected to the anode side of the rectifier element D1, when the potential between the switching element Q5 and the rectifier element D1 is largely increased, the clamp element D4 can perform clamping. However, when the potential is largely lowered, the clamp element D4 cannot perform clamping. Accordingly, even in a case where the potential between the switching element Q5 and the rectifier element D1 swings in any of the positive direction and the negative direction, the form illustrated in FIG. 4A in which the switching element Q5 can be protected is preferable. The same is applicable to the rectifier element D2, the clamp element D3, and the switching element Q6. That is, the cathode side of the clamp element D3 is connected to the anode side of the rectifier element D2, so that the switching element Q6 can be protected regardless of the direction of a voltage to be applied. Even in a case where the anode side of the clamp element D3 is connected to the anode side of the rectifier element D2, when the potential between the switching element Q6 and the rectifier element D2 is largely increased, the clamp element D3 can perform clamping. Additionally, in a case where the cathode side of the clamp element D3 (or D4) is connected to the cathode side of the rectifier element D2 (or D1), when the potential between the switching element Q6 (or Q5) and the rectifier element D2 (or D1) is largely lowered, the clamp element D3 (or D4) can perform clamping.

<Embodiment 2>

FIG. 5A and FIG. 5B each are a circuit diagram illustrating an example of a power conversion device including an inverter circuit. FIG. 5A illustrates a power conversion device 2 including an inverter circuit 20 of Embodiment 2, and FIG. 5B illustrates a power conversion device including a conventional inverter circuit for comparison. The power conversion device 2 illustrated in FIG. 5A includes the inverter circuit 20, and inductors L1, L2, and outputs an AC voltage converted by the inverter circuit 20 to an electric power load 23 through the inductors L1, L2.

The inverter circuit 20 illustrated in FIG. 5A includes a full-bridge inverter 21, and a short circuit part 22. Configurations of the power conversion device 2 and the inverter circuit 20 of Embodiment 2 other than the short circuit part 22 are similar to the configurations of the power conversion device and the inverter circuit of Embodiment 1, and therefore for the similar configurations, Embodiment 1 should be referred, and description will be herein omitted.

In the short circuit part 22 of the inverter circuit 20 illustrated in FIG. 5A, between a pair of electric power lines connected to the full-bridge inverter 21, switching elements Q5, Q6 are connected in series in a state where both drain sides are connected such that the conductive directions are the opposite directions. Additionally, clamp elements D3, D4 are connected between the switching element Q5 and the switching element Q6. The clamp element D3 has an anode side connected between the switching element Q5 and the switching element Q6, and a cathode side connected to a switching element Q1 and a switching element Q2 of the full-bridge inverter 21. The clamp element D4 has a cathode side connected between the switching element Q5 and the switching element Q6, and an anode side connected to a switching element Q3 and a switching element Q4 of the full-bridge inverter 21.

The switching elements Q5, Q6 provided in the short circuit part 22 are semiconductor switches each configured by use of a semiconductor such as an SJ-MOSFET, and reflux diodes are incorporated inversely parallel to each other. The clamp elements D3, D4 are configured by use of elements having rectifying action such as diodes.

As apparent from comparison of FIG. 5A and FIG. 5B, the inverter circuit 20 according to Embodiment 2 illustrated in FIG. 5A is different from the conventional inverter circuit in that the inverter circuit 20 includes the clamp elements D3, D4. In FIG. 5A, a potential on a positive side of an input voltage Vin is denoted by P (upper side in the figure), and a potential on a negative side is denoted by N (lower side in the figure). In a case where a midpoint potential M3 between the switching element Q5 and the switching element Q6 becomes higher than the P potential, the clamp element D3 brought into conduction, and the midpoint potential M3 approaches the P potential. In a case where the midpoint potential M3 becomes lower than the N potential, the clamp element D4 is brought into conduction, and the midpoint potential M3 approaches the N potential.

In the inverter circuit 20 illustrated in FIG. 5A, an SJ-MOSFET is used as each of the switching elements Q1, Q2, Q3, Q4, Q5, Q6. As described above, the clamp elements D3, D4 suppress variation of the midpoint potential M3, and therefore the clamp elements D3, D4 can reduce influence by a surge voltage. Therefore, while characteristics of the SJ-MOSFETs are utilized, it is possible to reduce adverse influence on the device.

<Experiment 1>

Now, a result of an experiment for simulatively applying a surge voltage in the inverter circuits according to the above embodiments will be described as a simulation test. As the simulation test according to Experiment 1, a phenomenon that occurred in a case where voltage input to the inverter circuit 20 described with reference to FIG. 5A started was confirmed. Experiment 1 was performed on condition of input voltage (DC): 370 Vdc, output voltage (AC): 202 Vac, rated power output: 5.5 kw, switching frequency: 20 kHz, inductors L1, L2: 700 µH. For comparison, the experiment was performed for the conventional inverter circuit illustrated in FIG. 5B along with the inverter circuit 20 of Embodiment 2 illustrated in FIG. 5A on the same condition.

Figure 6A:
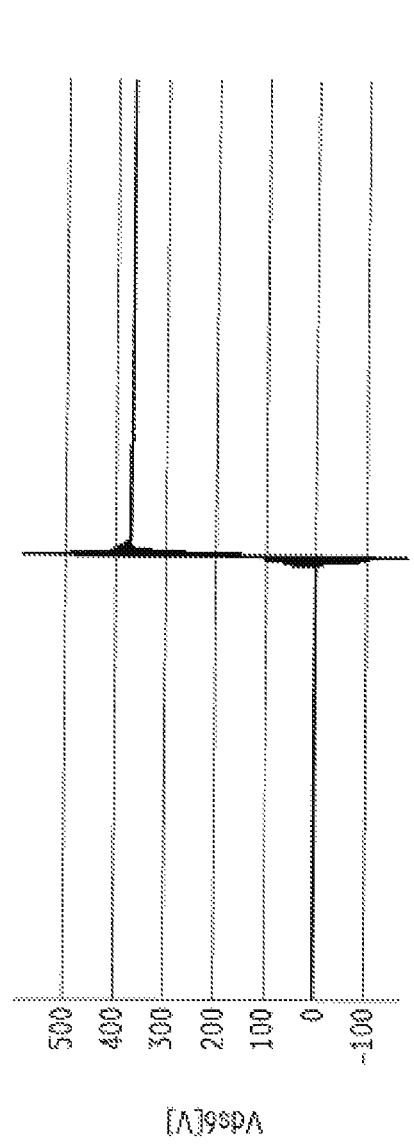
FIG. 6A and FIG. 6B each are a graph illustrating an experimental result for an inverter circuit.
Figure 6B:
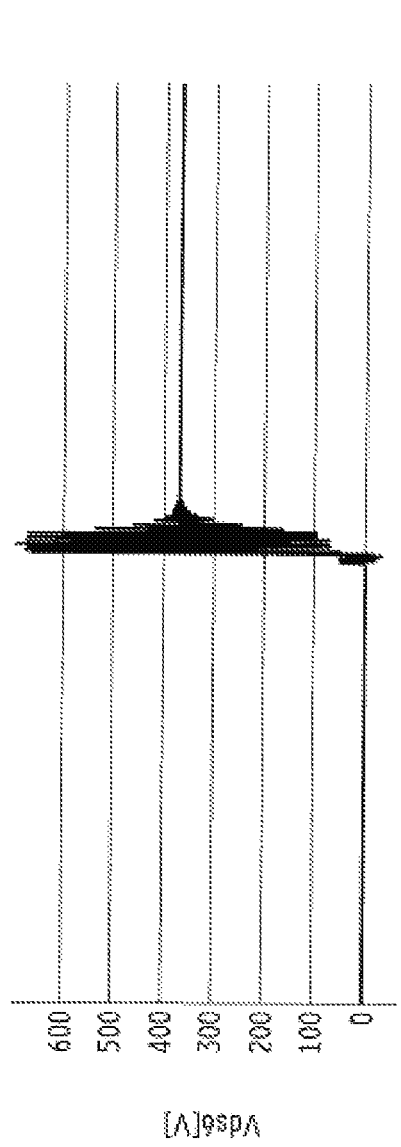

FIG. 6A and FIG. 6B each are a graph illustrating an experimental result for the inverter circuit. FIG. 6A and FIG. 6B each are a graph illustrating a change with time of a drain-source voltage Vds6 of the switching element Q6 in a case where voltage input starts on the above condition. In FIG. 6A and FIG. 6B, a horizontal axis denotes time [Time], and a vertical axis denotes the drain-source voltage Vds6 [V], and relation between the time and the drain-source voltage Vds6 is illustrated. FIG. 6A illustrates a change with time of the voltage Vds6 of the inverter circuit 20 of Embodiment 2 illustrated in FIG. 5A, and FIG. 6B illustrates a change with time of a voltage Vds6 of the conventional inverter circuit illustrated in FIG. 5B for comparison.

In the result of Experiment 1 for the conventional inverter circuit illustrated in FIG. 6B, a voltage Vds6 of about 700 V is applied between the drain and the source at timing when voltage application to the switching element Q6 starts. A withstand voltage of each switching element used in this experiment is 650 V, and therefore there is a possibility that the switching element is damaged on the above condition. On the other hand, in the result of Experiment 1 for the inverter circuit 20 of Embodiment 2 illustrated in FIG. 6A, the voltage Vds6 applied between the drain and the source at timing when voltage application to the switching element Q6 starts is suppressed to about 600 V which is the withstand voltage or less. Additionally, ringing time of the inverter circuit 20 of Embodiment 2 is shorter than ringing time of the conventional inverter circuit.

Figure 7A:
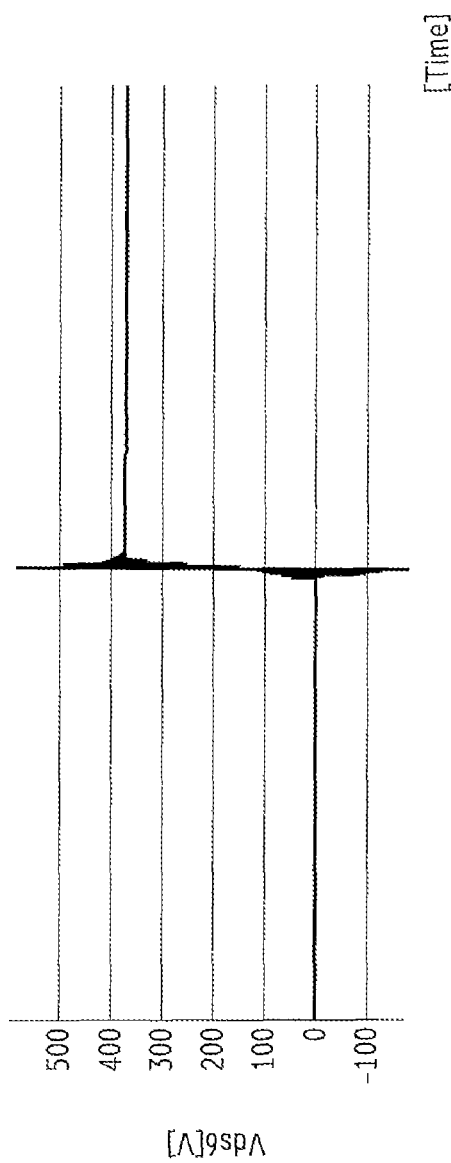
FIG. 7A and FIG. 7B each are a graph illustrating an experimental result for an inverter circuit.
Figure 7B:
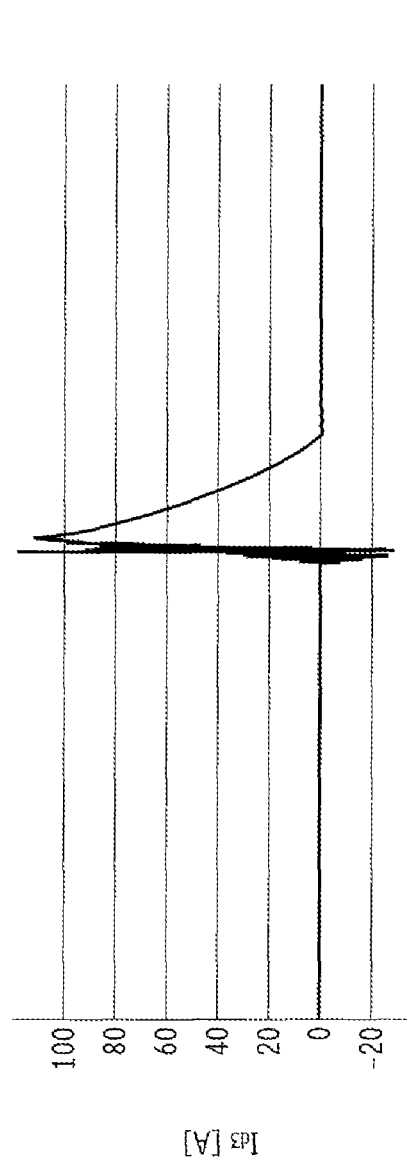

FIG. 7A and FIG. 7B each are a graph illustrating an experimental result for the inverter circuit. FIG. 7A is a graph similar to the graph of the FIG. 6A, and illustrates a change with time of a voltage Vds6 of the inverter circuit 20 of Embodiment 2 illustrated in FIG. 5A. FIG. 7B is a graph illustrating a change with time of a current flowing in the clamp element D3 provided in the inverter circuit 20 of Embodiment 2 illustrated in FIG. 5A, in a case where voltage input starts on the above condition. In FIG. 7B, a horizontal axis denotes time [Time], and a vertical axis denotes a current Id3 flowing in the clamp element D3, and relation between the time and the current Id3 is illustrated.

As illustrated in each of FIG. 7A and FIG. 7B, it was confirmed that when the voltage Vds6 applied to the switching element Q6 rapidly changed, the current Id3 passed through the clamp element D3, and a current Dd3 steeply rose, and thereafter became small.

Figure 8A:
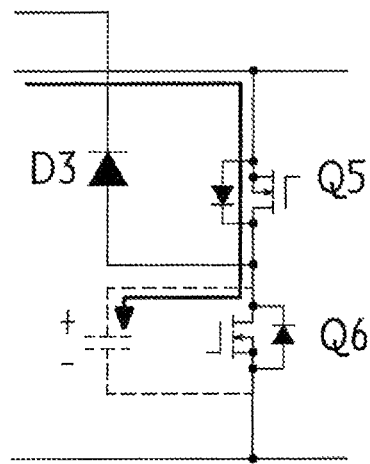
FIG. 8A and FIG. 8B each are a schematic diagram illustrating a situation generated in an experiment for an inverter circuit on a circuit diagram.
Figure 8B:
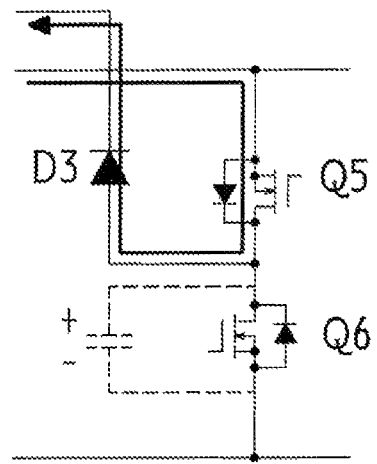

FIG. 8A and FIG. 8B each are a schematic diagram illustrating a situation generated in the experiment for the inverter circuit on a circuit diagram. FIG. 8A and FIG. 8B are schematic diagrams illustrated by superimposing a flow of a current generated in Experiment 1 for the inverter circuit 20 of Embodiment 2 illustrated in FIG. 5A on a part of the circuit diagram of the inverter circuit 10, based on the graphs illustrated in FIG. 7A and FIG. 7B, respectively. FIG. 8A illustrates a state where parasitic capacitance illustrated by broken lines is generated in the switching element Q6, and a current flows into the generated parasitic capacitance. As illustrated in FIG. 8A, when the parasitic capacitance is generated, a voltage applied to the switching element Q6 becomes excessive due to resonance based on the parasitic capacitance to become a surge voltage. Then, when a potential on the drain side of the switching element Q6 becomes larger than a potential (P potential in FIG. 5A) on the positive side of the input voltage by the surge voltage which becomes large in the positive direction, as illustrated in FIG. 8B, the clamp element D3 is brought into conduction, and a current based on the surge voltage flows backward to the input side. Accordingly, it is inferred that the current Id3 flowed by change illustrated in FIG. 7B, and the surge voltage applied to the switching element Q6 was suppressed.

<Experiment 2>

As the simulation test according to Experiment 2, a phenomenon that occurred in a case where voltage input to the inverter circuit 10 described with reference to FIG. 3A started was confirmed. Experiment 2 was performed on condition of input voltage (DC): 370 Vdc, output voltage (AC): 202 Vac, rated power output: 5.5 kw, switching frequency: 20 kHz, inductors L1, L2: 700 µH, similarly to Experiment 1.

Figure 9:
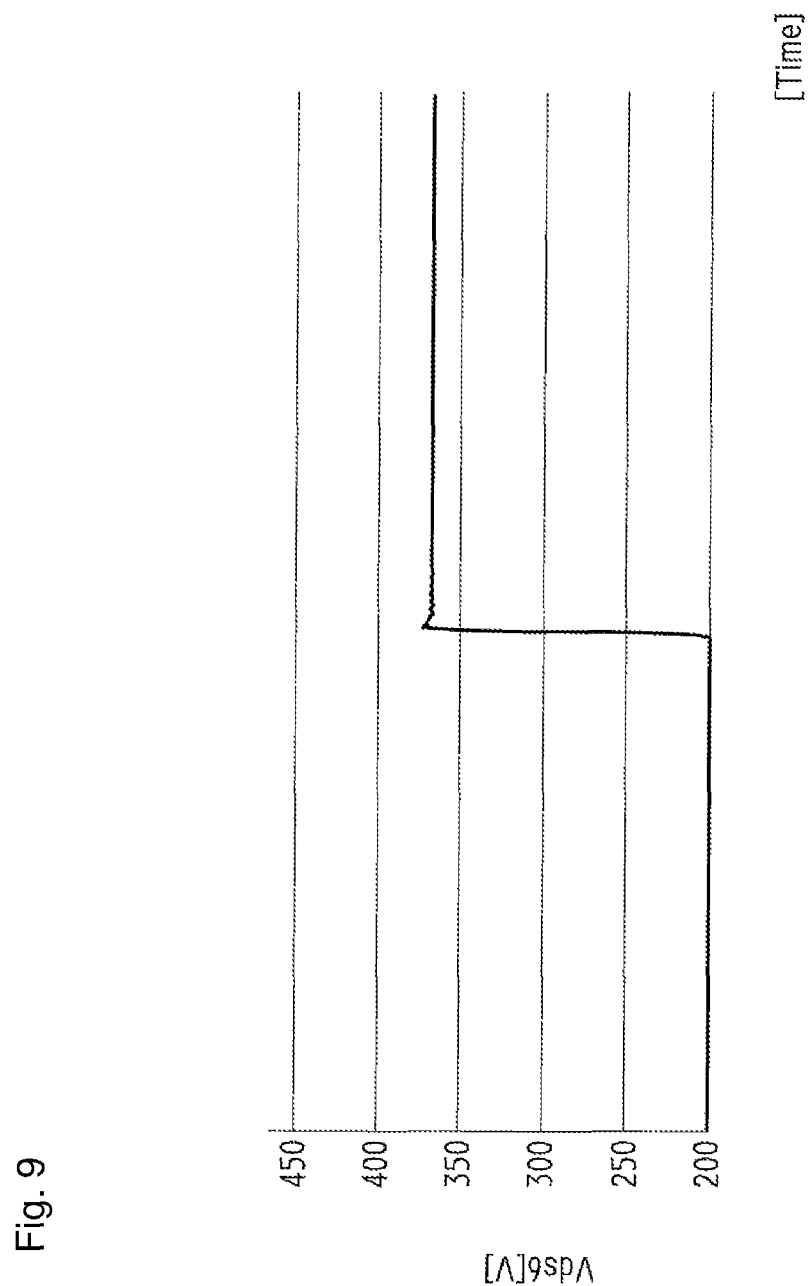
FIG. 9 is a graph illustrating an experimental result for an inverter circuit.

FIG. 9 is a graph illustrating an experimental result for the inverter circuit. FIG. 9 is a graph illustrating a change with time of a drain-source voltage Vds6 of the switching element Q6 provided in the inverter circuit 10 of Embodiment 1 illustrated in FIG. 3A in a case where voltage input starts on the above condition. In FIG. 9, a horizontal axis denotes time [Time], and a vertical axis denotes the drain-source voltage Vds6 [V], and relation between the time and the drain-source voltage Vds6 is illustrated. As illustrated in FIG. 9, it can be confirmed that in the inverter circuit 10 of Embodiment 1, a surge voltage and ringing are hardly generated in the drain-source voltage Vds6 of the switching element Q6.

Figure 10A:
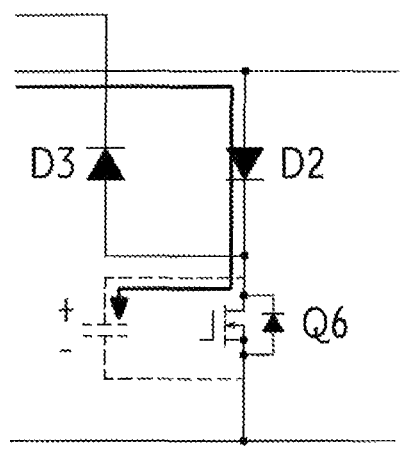
FIG. 10A and FIG. 10B each are a schematic diagram illustrating a situation generated in an experiment for an inverter circuit on a circuit diagram.
Figure 10B:
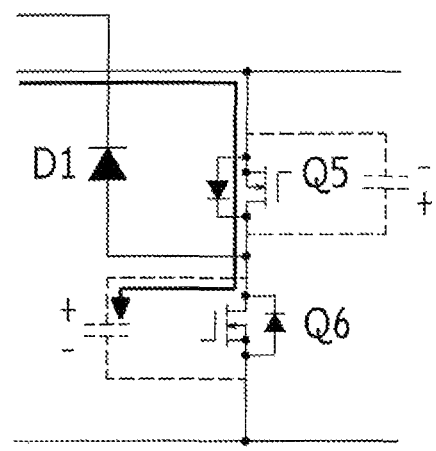

FIG. 10A and FIG. 10B each are a schematic diagram illustrating a situation generated in the experiment for the inverter circuit on a circuit diagram. FIG. 10A illustrates a flow of a current generated in Experiment 2 for the inverter circuit 10 of Embodiment 1 illustrated in FIG. 3A, the flow of the current being superimposed on a part of the circuit diagram of the inverter circuit 10. FIG. 10B illustrates a flow of a current generated in Experiment 1 for the inverter circuit 20 of Embodiment 2 illustrated in FIG. 5A, the flow of the current being superimposed on a part of the circuit diagram of the inverter circuit 20.

In a case where the reflux diode incorporated in the switching element Q6 illustrated in FIG. 10B is used, when the reverse recovery characteristic of the reflux diode is not sufficient, that is, when reverse recovery charge Qrr is large, the drain-source voltage Vds6 of the switching element Q6 increases. Therefore, when the reflux diode incorporated in the switching element Q5 is changed to a non-conduction state, ringing may be generated in the switching element Q6. Accordingly, when the inverter circuit 20 of Embodiment 2 is employed, a switching element that incorporates a reflux diode having a high reverse recovery characteristic is preferably selected. Consequently, it is possible to suppress ringing.

As illustrated in FIG. 10A, in a case where a diode such as an SiC diode having an excellent reverse recovery characteristic is used as the rectifier element D2, and the rectifier element D2 and the switching element Q6 are connected to each other, ringing can be suppressed regardless of the presence or absence and the characteristic of the reflux diode incorporated in the switching element Q6. That is, both the clamp element, and the rectifier element having the excellent reverse recovery characteristic are used, so that a surge voltage and ringing can be suppressed so as to be hardly generated as illustrated in FIG. 9. Therefore, in a case where an SJ-MOSFET having a low reflux diode characteristic of an incorporated reflux diode is used as the switching element, the rectifier element and the switching element are preferably connected in series, and are preferably connected to the clamp element as illustrated as Embodiment 1. Consequently, it is possible to prevent a backward flow in the circulation portion of the HERIC CIRCUIT, and to sufficiently suppress a surge voltage and ringing. Accordingly, it is possible to stably use the SJ-MOSFET, and it is possible to implement high efficiently of the inverter circuit.

<Other Experiments>

Figure 11:
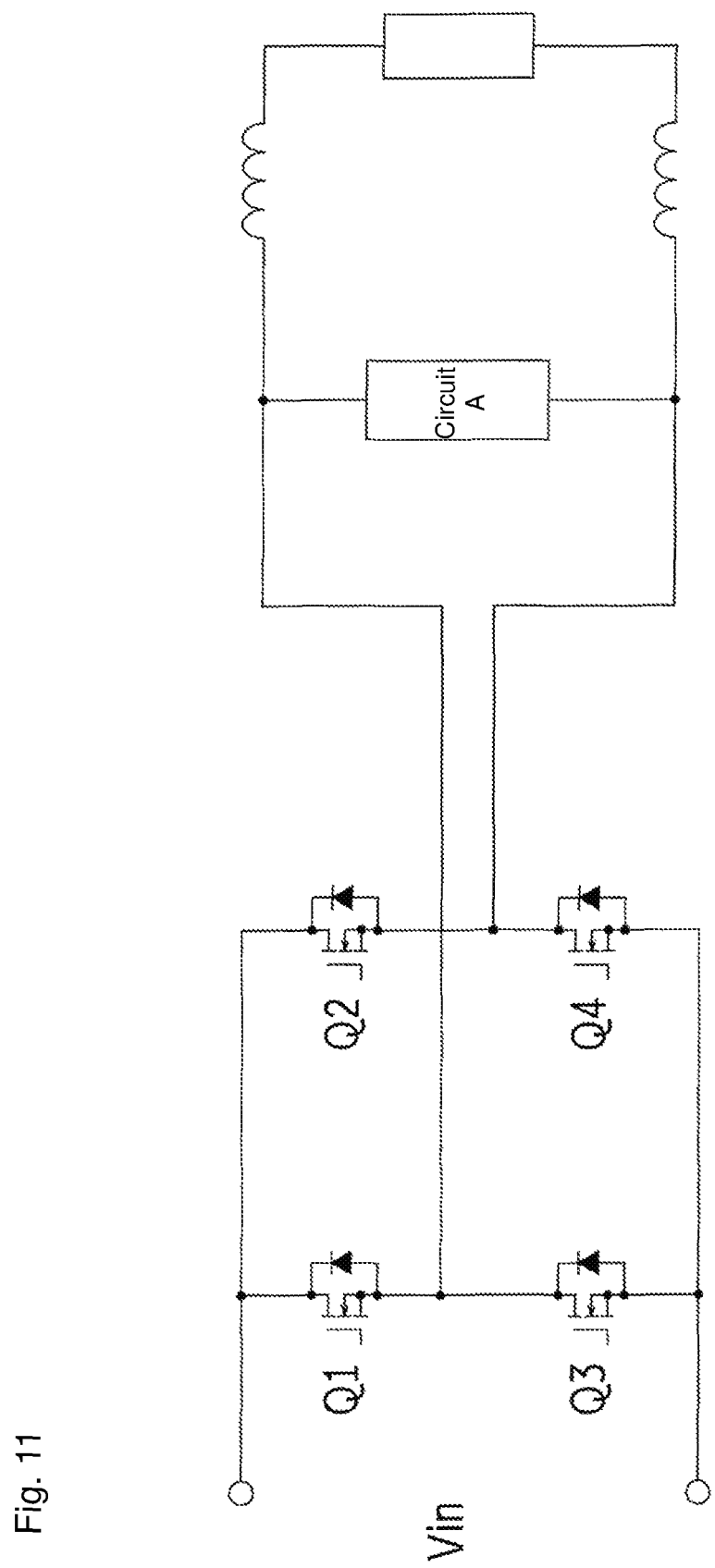
FIG. 11 is a circuit diagram illustrating a schema of a power conversion device including an inverter circuit used in an experiment.

As experiments other than the above Experiment 1 and Experiment 2, the configuration of the inverter circuit was deformed, and simulation tests were performed on the same condition. Results of these other experiments will be described. FIG. 11 is a circuit diagram illustrating a schema of a power conversion device including an inverter circuit used in the experiment. The inverter circuit provided in the power conversion device illustrated in FIG. 11 comprehensively illustrates a configuration of a short circuit part of an inverter circuit illustrated as Embodiment 1, Embodiment 2, and the comparative example. That is, the above inverter circuits have a common configuration except for a circuit configuration of a short circuit part illustrated as a circuit A in FIG. 11. In each of the following experiments, only a circuit of the short circuit part illustrated as the circuit A is illustrated, an experimental result thereof will be described. In the simulation tests according to the other experiments, Experiment 3-1, Experiment 3-2, and Experiment 3-3 for the inverter circuit 10 described in Embodiment 1 and the modification thereof were performed, and Comparison 1 and Comparison 2 were performed as conventional technologies for comparison.

Figure 12A:
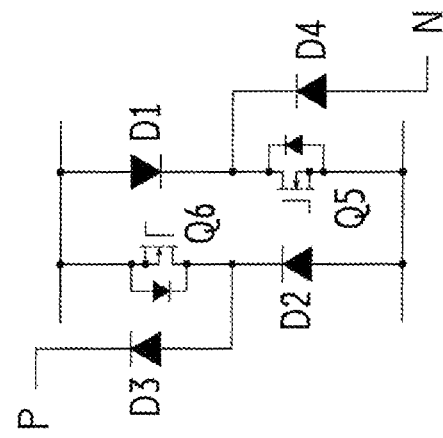
FIG. 12A, FIG. 12B and FIG. 12C each are a circuit diagram illustrating an inverter circuit used in an experiment.
Figure 12B:
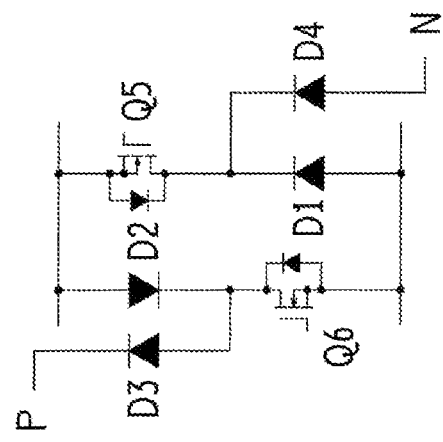
Figure 12C:
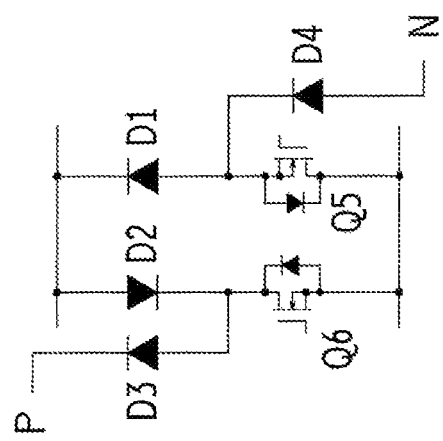
Figure 13A:
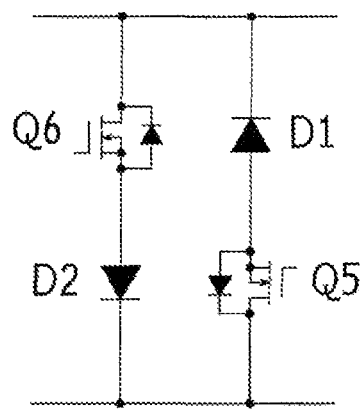
FIG. 13A and FIG. 13B each are a circuit diagram illustrating an inverter circuit used in an experiment.
Figure 13B:
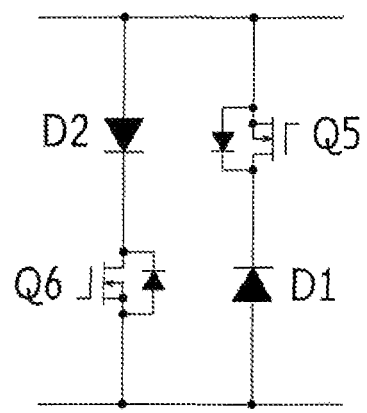

As the other experiment, influence by the conductive direction of the rectifier element D2 provided in the short circuit part 12 of the inverter circuit 10 illustrated in FIG. 3A was confirmed. FIG. 12A, FIG. 12B, FIG. 12C, FIG. 13A and FIG. 13B each are a circuit diagram illustrating an inverter circuit used in an experiment. FIG. 12A, FIG. 12B and FIG. 12C each illustrate a configuration of a circuit A of a modification, in which the conductive direction of the rectifier element is changed, in the inverter circuit 10 illustrated in Embodiment 1. FIG. 12A illustrates a circuit A for Experiment 3-1 performed as the simulation test, the circuit A being the same form as the inverter circuit 10 of Embodiment 1 illustrated in FIG. 3A. FIG. 12B illustrates a circuit A for Experiment 3-2 performed as the simulation test, in which respective positions of the rectifier element D1 and the switching element Q5 are replaced in the circuit A of Experiment 3-1, and the cathode side of the clamp element D4 is connected to the cathode side of the rectifier element D1. FIG. 12C illustrates a circuit A for Experiment 3-3 performed as the simulation test, in which respective positions of the rectifier element D2 and the switching element Q6 are replaced in the circuit A of Experiment 3-1, and the anode side of the clamp element D3 is connected to the cathode side of the rectifier element D2, furthermore, the conductive direction of the rectifier element D1 is reversed, and the cathode side of the clamp element D4 is connected to the cathode side of the rectifier element D1. FIG. 13A and FIG. 13B each illustrate a configuration of a circuit A in a simulation test for a conventional technology in which the clamp elements D3, D4 are not provided, the simulation test being performed for comparison. FIG. 13A illustrates a circuit A for Comparison 1, in which the anode sides of the rectifier elements D1, D2 are connected to the source sides of the switching elements Q5, Q6. FIG. 13B illustrates a circuit A for Comparison 2, in which the cathode sides of the rectifier elements D1, D2 are connected to the drain sides of the switching elements Q5, Q6.

Figure 14A:
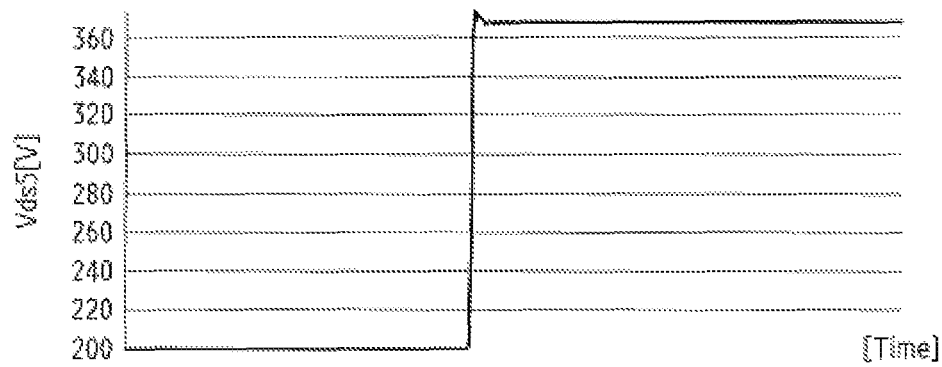
FIG. 14A, FIG. 14B and FIG. 14C each are a graph illustrating an experimental result for an inverter circuit.
Figure 14B:
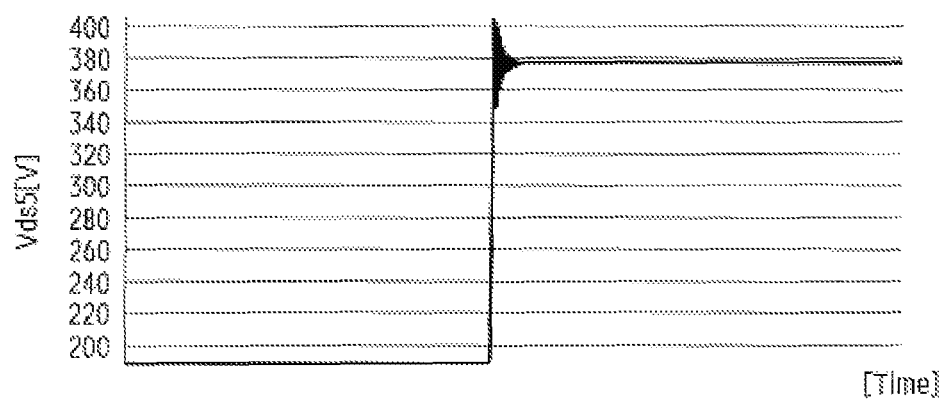
Figure 14C:
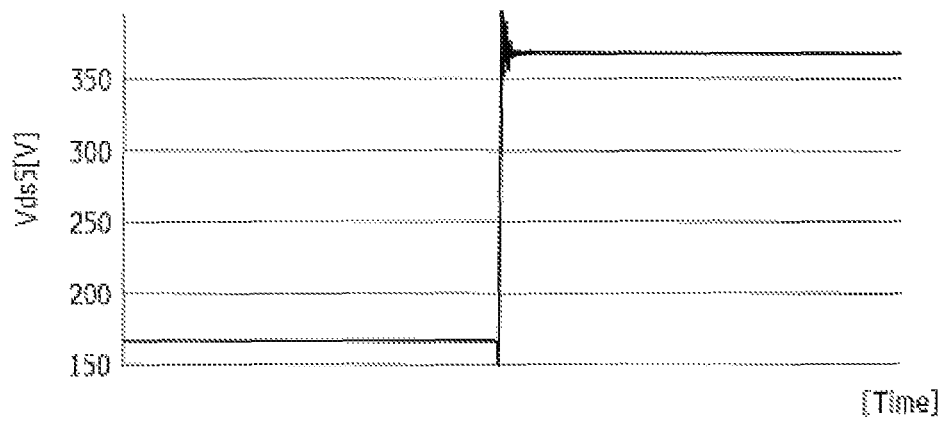
Figure 15A:
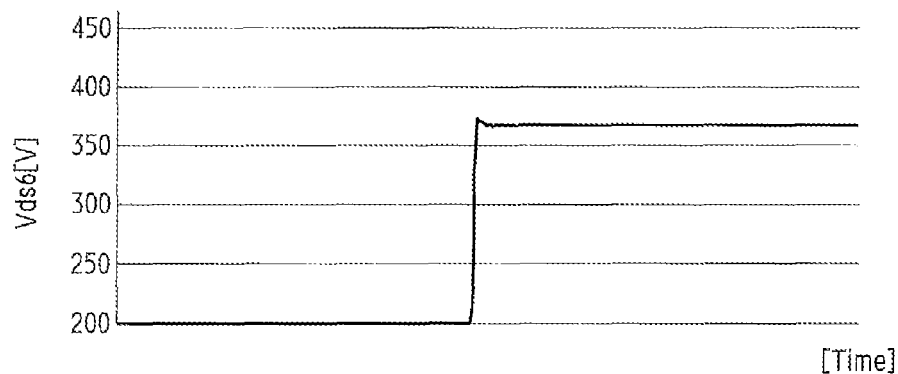
FIG. 15A, FIG. 15B and FIG. 15C each are a graph illustrating an experimental result for an inverter circuit.
Figure 15B:
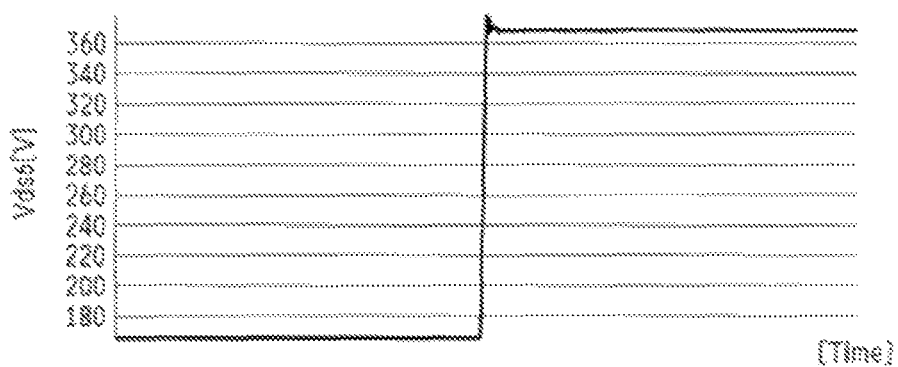
Figure 15C:
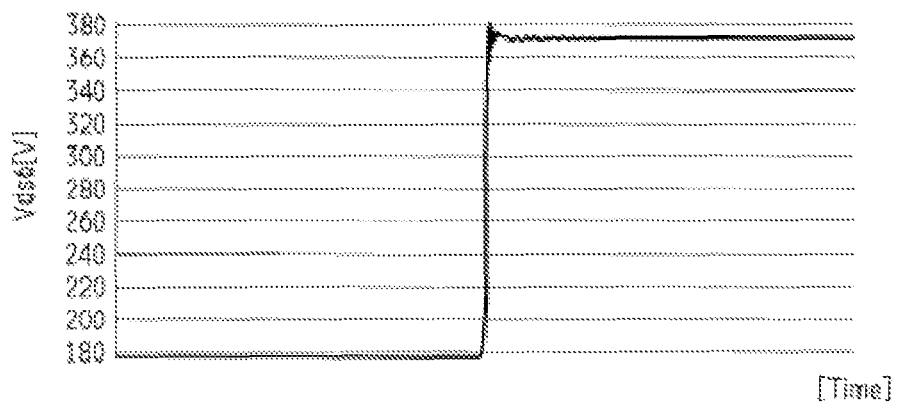

FIG. 14A, FIG. 14B and FIG. 14C to FIG. 16A and FIG. 16B each are a graph illustrating an experimental result for the inverter circuit. FIG. 14A, FIG. 14B and FIG. 14C illustrate changes with time of a voltage Vds5 applied between the drain and the source of the switching element Q5 in Experiment 3-1, Experiment 3-2 and Experiment 3-3, respectively. FIG. 15 A, FIG. 15B and FIG. 15C illustrate changes with time of a voltage Vds6 applied between the drain and the source of the switching element Q6 in Experiment 3-1, Experiment 3-2 and Experiment 3-3, respectively.

Figure 16A:
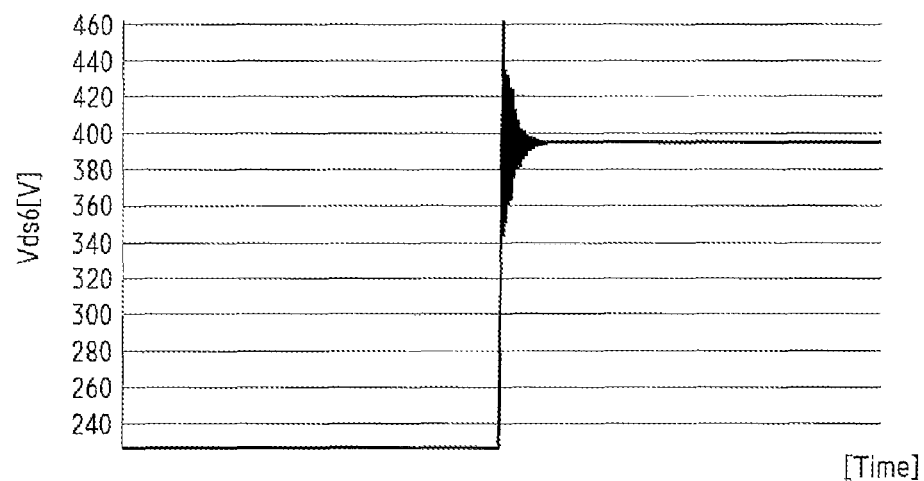
FIG. 16A and FIG. 16B each are a graph illustrating an experimental result for an inverter circuit.
Figure 16B:
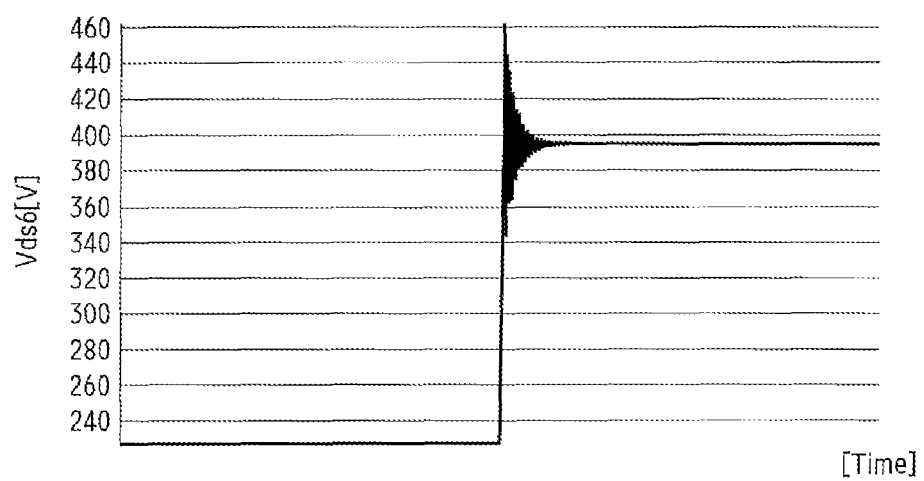

FIG. 16A and FIG. 16B illustrate changes with time of a voltage Vds6 applied between the drain and the source of the switching element Q6 in Comparison 1 and Comparison 2. In each of the graphs illustrated in FIG. 14A, FIG. 14B and FIG. 14C to FIG. 16A and FIG. 16B, a horizontal axis denotes time [Time], and a vertical axis denotes the drain-source voltage Vds5 [V] or the drain-source voltage Vds6 [V], and relation between the time and the drain-source voltage Vds5 or the drain-source voltage Vds6 is illustrated. However, scales in the vertical axis direction are set in accordance with a change width so as to grasp a whole of the changes of the voltage Vds5 and the voltage Vds6. Compared to Comparison 1 and Comparison 2 according to conventional technologies in which the clamp elements D3, D4 are not provided, in Experiment 3-1 to Experiment 3-3, a surge voltage and ringing for the drain-source voltage Vds6 of the switching element Q6 are suppressed. Additionally, compared to Experiments 3-2 and 3-3, a surge voltage and ringing for each of the switching element Q5 and the switching element Q6 are suppressed in Experiment 3-1. As described above, the cathode side of the clamp element is connected to the anode side of the rectifier element, and the anode side of the clamp element is connected to the cathode side of the rectifier element, that is, different polarities of the rectifier element and the clamp element are connected, so that the rectifier element or the clamp element is brought into conduction even in a case where a voltage significantly becomes high, or even in a case where a voltage significantly becomes low, and therefore it is possible to suppress the surge voltage and ringing.

FIG. 17A and FIG. 17B are a circuit diagram illustrating an inverter circuit used in an experiment. FIG. 17A illustrates a circuit A for Experiment 4 performed as the simulation test, the circuit A being the same form as the inverter circuit 20 of Embodiment 2 illustrated in FIG. 5A. FIG. 17B illustrates a circuit A for Comparison 3, the circuit A being the same form as the conventional inverter circuit illustrated in FIG. 5B.

Figure 18A:
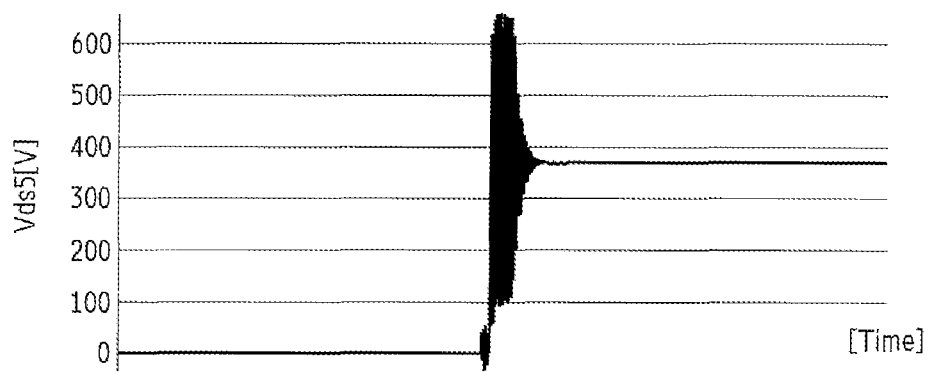
FIG. 18A and FIG. 18B each are a chart illustrating an experimental result for an inverter circuit.
Figure 18B:
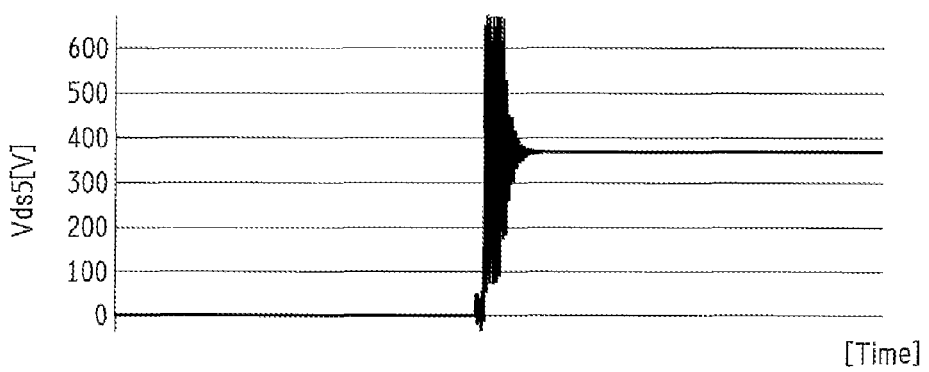
Figure 19A:
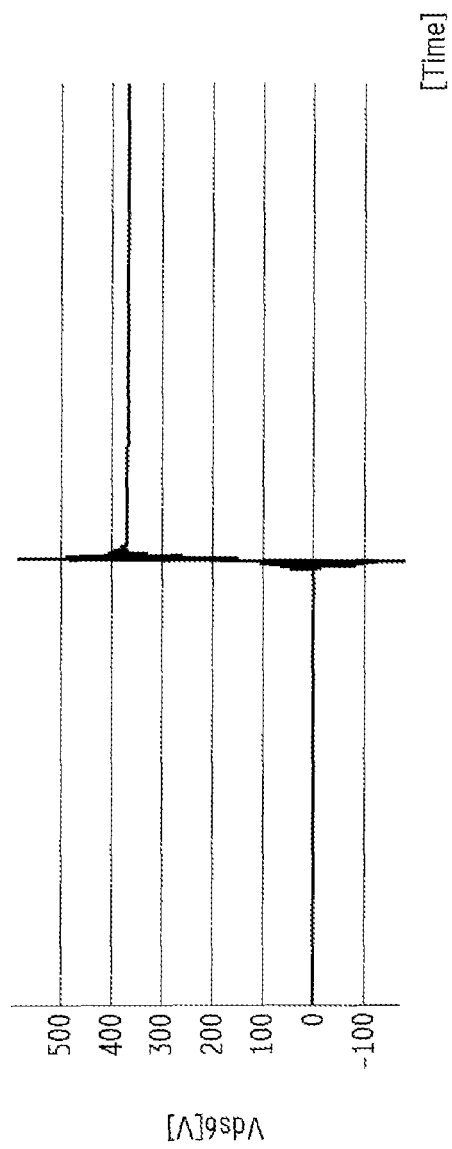
FIG. 19A and FIG. 19B each are a chart illustrating an experimental result for an inverter circuit.
Figure 19B:
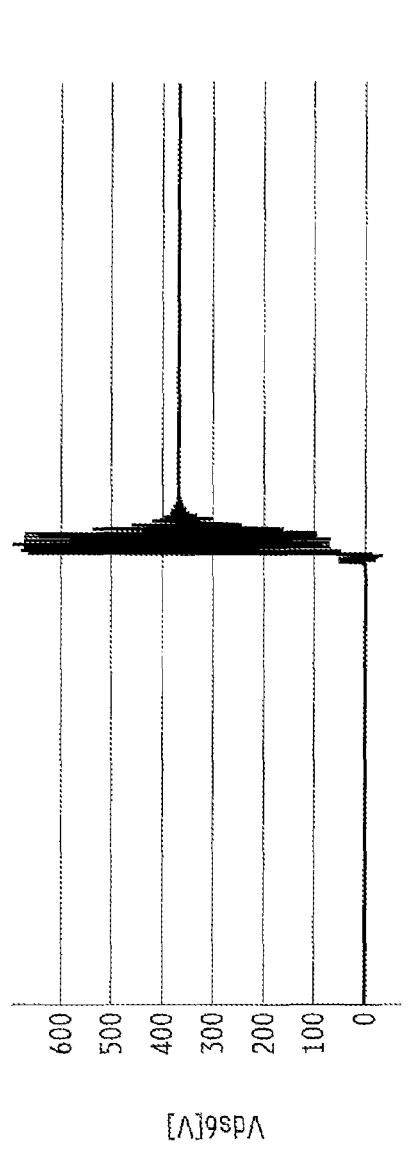

FIG. 18A, FIG. 18B, FIG. 19A and FIG. 19B each are a graph illustrating an experimental result for the inverter circuit. FIG. 18A illustrates a change with time of a voltage Vds5 applied between the drain and the source of the switching element Q5 in Experiment 4. FIG. 18B illustrates a change with time of a voltage Vds6 applied between the drain and the source of the switching element Q6 in Experiment 4. FIG. 19A illustrates a change with time of the voltage Vds5 applied between the drain and the source of a switching element Q5 in Comparison 3. FIG. 19B illustrates a change with time of the voltage Vds6 applied between the drain and the source of the switching element Q6 in Comparison 3. In each of the graphs of FIG. 18A, FIG. 18B, FIG. 19A and FIG. 19B, a horizontal axis denotes time [Time], and a vertical axis denotes the drain-source voltage Vds5 [V] or the drain-source voltage Vds6 [V], and relation between the time and the drain-source voltage Vds5 or the drain-source voltage Vds6 [V] is illustrated. As illustrated in FIG. 18A, FIG. 18B, FIG. 19A and FIG. 19B, compared to Comparison 3 according to conventional technologies in which the clamp elements D3, D4 are not provided, in Experiment 4, a surge voltage and ringing for both the drain-source voltage Vds5 of the switching element Q5 and the drain-source voltage Vds6 of the switching element Q6 are suppressed.

The present invention is not limited to the above embodiments, and may be embodied in other specific forms. The above embodiments are therefore to be considered in all respects as illustrative and not restrictive, the scope of the invention being indicated by the appended claims rather than by the foregoing description and all changes and modification which come within the meaning and range of equivalency of the claims are therefore intended to be embraced therein.

For example, in the above embodiments, an SJ-MOSFET that incorporates the reflux diode is used as each switching element. However, the present invention is not limited to this, and can be developed in various forms. For example, a general MOSFET may be used.

In the above embodiment, although another end of the clamp element is connected to the full-bridge inverter, the embodiment can be developed in various forms. For example, another end of the clamp element may be connected to a suitable potential other than the full-bridge inverter.

Furthermore, in the above embodiments, one or more aspects are applied to the solar power generation system. However, the present invention is not limited to this, and can be applied to various inverters such as an onboard inverter that converts a DC to an AC.

DESCRIPTION OF SYMBOLS 1, 2 power conversion device
10, 20 inverter circuit
11, 21 full-bridge inverter
12, 22 short circuit part
Q1, Q2, Q3, Q4 switching element
D1, D2 rectifier element
D3, D4 clamp element
L1, L2 inductor

The invention claimed is:

1. An inverter circuit comprising a short circuit part configured to short-circuit output from a full-bridge inverter, wherein
    the short circuit part comprises:
        a rectifier element and a switching element connected in series; and
        a clamp element connected between the rectifier element and the switching element, wherein
        the clamp element comprises an anode side connected to a cathode side of the rectifier element, or a cathode side connected to an anode side of the rectifier element.

2. The inverter circuit according to claim 1, wherein
    the clamp element further comprises a cathode side connected to a cathode side of the rectifier element, or an anode side connected to an anode side of the rectifier element.

3. The inverter circuit according to claim 1, wherein
    the rectifier element and the switching element connected in series comprise two sets each comprising one of the rectifier elements and one of the switching elements, and
    the two sets are wired in parallel such that respective conductive directions of each of the two sets are opposite directions.

4. The inverter circuit according to claim 1, wherein
    one of the anode side or the cathode side of the clamp element not connected to the rectifier element is connected to the full-bridge inverter.

5. The inverter circuit according to claim 1, wherein
    the switching element comprises a field effect transistor comprising super junction structure.

6. A power conversion device comprising:
the inverter circuit according to claim 1;
an input part; and
an output part, wherein
the input part is configured to receive an input of DC power,
the output part is configured to output AC power, and
the inverter circuit converts a DC current to an AC current.

7. An inverter circuit comprising a short circuit part configured to short-circuit an output from a full-bridge inverter, wherein
the short circuit part comprises:
two switching elements connected in series; and
a clamp element connected between the two switching elements, wherein
the clamp element comprises an anode side connected between the two switching elements, or a cathode side connected between the two switching elements.

8. The inverter circuit according to claim 7, wherein
the two switching elements are connected such that respective conductive directions of each of the two switching elements are opposite directions, and
the clamp element comprises: a first clamp element having an anode side connected between the two switching elements and a second clamp element having a cathode side connected between the two switching elements.

9. The inverter circuit according to claim 7, wherein
one of the anode side or the cathode side of the clamp element not connected between the two switching elements is connected to the full-bridge inverter.

10. The inverter circuit according to claim 7, wherein
the two switching elements each comprise a field effect transistor having a super junction structure.

11. A power conversion device comprising:
the inverter circuit according to claim 7;
an input part; and
an output part, wherein
the input part configured to receive an input of DC power,
the output part is configured to output AC power, and
the inverter circuit converts a DC current to an AC current.

* * * * *